(No Model.)
J. WRIGLEY.
SEMAPHORE AND REVOLVING LAMP.
No. 496,080. Patented Apr. 25, 1893.
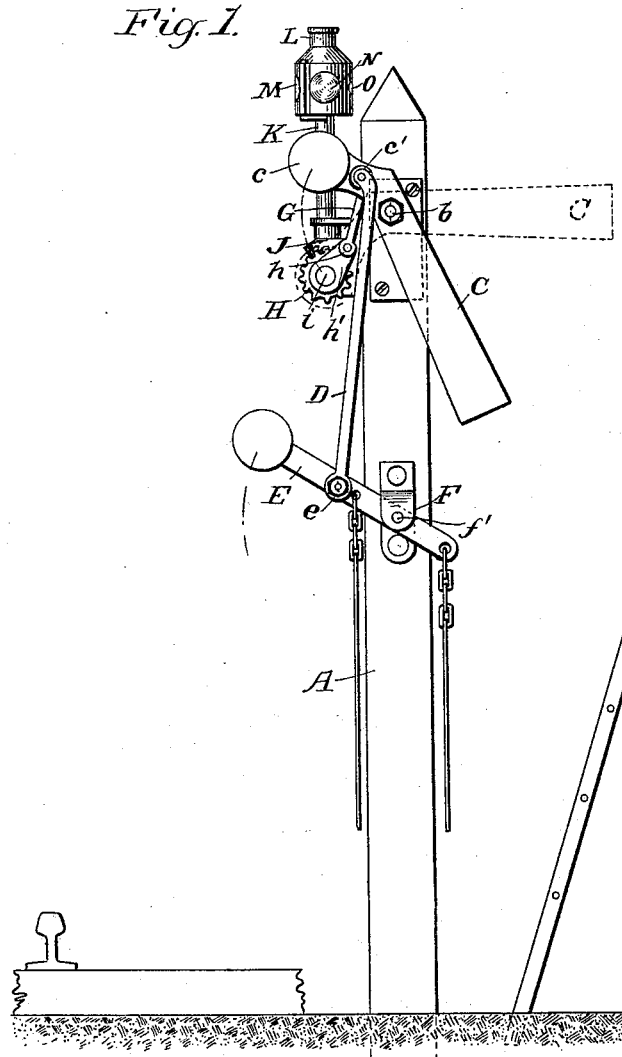
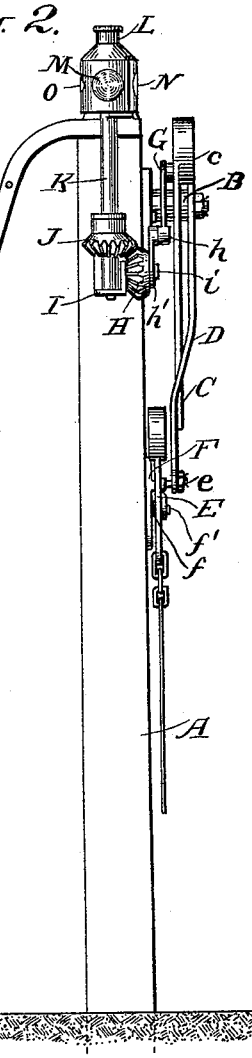
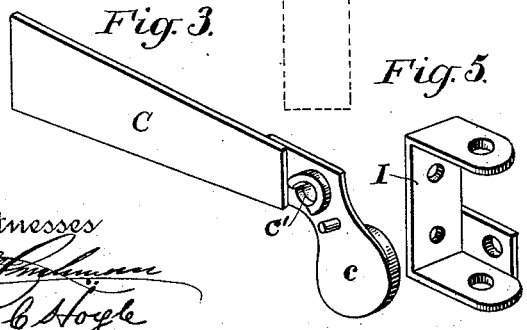
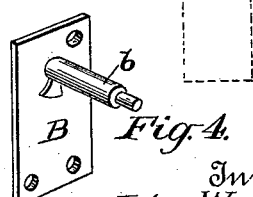

UNITED STATES PATENT OFFICE.

JOHN WRIGLEY, OF ELMIRA, NEW YORK.

SEMAPHORE AND REVOLVING LAMP.

SPECIFICATION forming part of Letters Patent No. 496,080, dated April 25, 1893.

Application filed June 15, 1892. Serial No. 436,863. (No model.)

*To all whom it may concern:*

Be it known that I, JOHN WRIGLEY, a citizen of the United States, residing at Elmira, in the county of Chemung and State of New York, have invented certain new and useful Improvements in a Combined Semaphore and Revolving Lamp; and I do hereby declare the following to be a full, clear, and exact description of the invention, such as will enable others skilled in the art to which it appertains to make and use the same.

My invention relates to the combination of a semaphore and revolving lamp for signaling rail-road trains: and the object of my invention, is, to provide a practical and effective mechanism for signaling rail-road trains in combination with a revolving signal lamp: I attain this object by a certain combination and arrangement of parts fully described in this specification and illustrated in the accompanying drawings, in which, Figure 1 is a front view of the post having the signal lamp and the mechanism for operating the same attached thereto. Fig. 2 is a side view of the invention on the side adjacent the rail-road. Figs. 3, 4 and 5 are views of the lamp and different portions of the mechanism, with portions broken away with a view of illustrating certain features in detail.

Referring to the drawings the dotted lines indicate the relative positions the lever C and the balance lever E assume in operation and the letter A designates the post alongside the rail-road which is usually placed some two or three hundred feet in the rear of the signal house. To this post near the top there is secured a bracket B, which is provided with a projecting axle $b$ upon which is mounted the lever C. The end $c$ of said lever is bent downward and is provided with another axle $c'$ which projects upon both sides of the lever. To the outer end of said axle $c'$ there is connected one end of a connecting-rod D which extends downward and is attached to the projecting axle $e$ of the balance lever E. Said balance lever is located in the slot $f$ upon an axle $f'$ of the bracket F which is secured to the post A. Upon the inner end of the axle bar $c'$ there is located the upper end of a small link or plate G, which extends downward, and is secured to a projecting axle $h$ upon a projecting portion $h'$ of bevel wheel H. This bevel wheel H is mounted upon an axle $i$ upon the side of the U-shaped bracket I, which is also secured to the side of the post A. The bevel wheel H meshes with another bevel wheel J which is rigidly secured to a revolving shaft K which has bearings $k$ in the projecting ends of the U-shaped bracket I. Upon the top of the revolving shaft K there is located a detachable lamp L, which is provided with the red and white lenses M and N which are about five inches in diameter. Upon the opposite sides of this lamp there are two small blue bull's-eye lenses O about one inch in diameter the function of which is to enable the signal man at any time to see if the lamp is burning from signal house.

Such being the arrangement and combination of my combined semaphore and signal lamp; it will readily be understood how the operation of the lever C, as indicated by the dotted lines, will manipulate or revolve the signal lamp L at the will of the operator or signal man so that the signal of danger, or otherwise, as understood by rail-road men, can be given as desired.

I attach great importance to my invention for the following reason, namely: The semaphore arm as a means of signaling is now universally adopted by all first class railroads, which consists of an arm, with a red lens in one side and a white lens upon the opposite side, the red signifying danger, the white safety. It is frequently the case that the danger signal lens is broken out by some malicious person and the result, is, that the white is seen and a collision the result.

As my invention disposes altogether of the arm as a means of signaling and adopts this lamp as described, it necessarily obviates this difficulty, for the reason that if the red lens should be broken the white will not appear and mislead the rail-road men.

As it is apparent that my invention is a very practical and useful device for the purposes aforesaid I deem it useless to further expatiate upon its merits.

P represents the ladder for ascending to light the signal lamp.

What I claim is—

1. In a railroad signaling device, the combination, with a post, of a vertical shaft supported at the upper portion thereof and carrying at one end a lamp and at the other end a bevel gear, a counter-shaft carrying a gear meshing with the gear of the vertical shaft, a pivoted lever, a plate connecting the lever and the gear on the counter-shaft, and a balance lever connected with the first-named lever, substantially as described.

2. In a rail-road signaling device, the semaphore comprising the following mechanism, the bracket B having the axle $b$ and secured to the post A the lever C mounted upon the axle $b$ said lever being provided with an axle $c'$ projecting upon both sides thereof, the connecting rod connecting the outer end of the axle $c'$ and the projecting axle $e$ of the balance lever E, the balance lever located in the slot $f$ of the bracket F, the bracket F secured to the post A, the link or plate G, connecting the inner end of the axle bar $c'$ and the axle $h$ of the bevel-wheel H, the U-shaped bracket secured to the post A near the top thereof, the bevel-gear mechanism having bearings in said bracket I and the revolving shaft K. in combination with the revolving signal lamp located upon the top of the shaft K, all substantially as described and set forth.

In testimony whereof I affix my signature in presence of two witnesses.

JOHN WRIGLEY.

Witnesses:
S. F. WOOD,
J. H. MCMAHON.